(12) United States Patent
Hayata

(10) Patent No.: US 6,381,359 B1
(45) Date of Patent: Apr. 30, 2002

(54) BONDING APPARATUS

(75) Inventor: Shigeru Hayata, Tachikawa (JP)

(73) Assignee: Kabushiki Kaisha Shinkawa, Tokyo (JP)

( * ) Notice: Subject to any disclaimer, the term of this patent is extended or adjusted under 35 U.S.C. 154(b) by 0 days.

(21) Appl. No.: 09/241,009

(22) Filed: Feb. 1, 1999

(30) Foreign Application Priority Data

Feb. 2, 1998 (JP) .......................................... 10-035488

(51) Int. Cl.$^7$ ............................ G06K 9/00; G02B 26/08
(52) U.S. Cl. ........................ 382/151; 359/196; 359/362
(58) Field of Search ........................ 382/151; 396/384; 356/124, 135–137, 490; 359/196, 362, 365, 381, 382, 384, 385; 228/103, 105; 250/310

(56) References Cited

U.S. PATENT DOCUMENTS

| | | | | |
|---|---|---|---|---|
| 4,592,636 A | * | 6/1986 | Kato et al. ................... | 354/225 |
| 5,059,559 A | * | 10/1991 | Takahashi et al. .......... | 437/220 |
| 5,225,026 A | * | 7/1993 | Ozawa et al ................ | 156/378 |
| 5,777,674 A | * | 7/1998 | Ohmuro ...................... | 348/338 |
| 5,886,313 A | * | 3/1999 | Krause et al. ........... | 219/121.6 |
| 5,903,662 A | * | 5/1999 | Decarlo ...................... | 382/151 |

FOREIGN PATENT DOCUMENTS

JP          6-28272       4/1994

* cited by examiner

*Primary Examiner*—Andrew W. Johns
*Assistant Examiner*—Kanji Patel
(74) *Attorney, Agent, or Firm*—Koda & Androlia

(57) ABSTRACT

A bonding apparatus with an optical detecting device that detects any positional discrepancy between first and second parts which are to be bonded together, the optical detecting device including an optical probe that comprises: first and second image acquisition prisms which respectively reflect, in different directions, first and second images of the first and second parts respectively; a first optical system introduction prism (or mirrors) which causes the first image of the first part that passes through the first image acquisition prism to be reflected an even number of times and then sends this first image to a first image pick-up device through a first focusing device; and a second optical system introduction prism which causes the second image of the second part that passes through the second image acquisition prism to be reflected an odd number of times and then sends this second image to a second image pick-up device through a second focusing device.

5 Claims, 6 Drawing Sheets

BONDING APPARATUS

BACKGROUND OF THE INVENTION

1. Field of the Invention

The present invention relates to a bonding apparatus for bonding two parts such as a semiconductor chip and a substrate, lead frame or tab tape and more particularly to an optical detection device for detecting positional discrepancies between the two parts so as to make an alignment thereof.

2. Prior Art

For example, the apparatus disclosed in Japanese Patent Application Publication (Kokoku) No. H6-28272 is known as a conventional bonding apparatus that is equipped with an optical detection device. This optical detection device is comprised of an optical probe which is moved between two parts positioned so as to face each other for being bonded, first and second optical means which focus respective images of the two parts from the optical probe, and an image pickup means which pick up the images focused by the first and second optical means. The two parts are aligned based upon the detection results obtained by the optical detection device, and then bonding is performed for these two parts.

This apparatus will be described in more detail with reference to FIGS. 4 through 7.

As shown in FIG. 4, a substrate 1 is positioned and held by a substrate chuck 3 which is installed on an XY table 2, and a semiconductor chip 4 is held by a chip chuck 6 disposed on the bonding head 5. After the semiconductor chip 4 is moved to a point above the substrate 1, the bonding head 5 is lowered, and the chip 4 is bonded to the substrate 1. Here, the bonding head 5 is disposed on a supporting element 7 in a manner that the bonding head 5 can be raised and lowered. An optical detection device 10 is installed on an XY table 11 and moved between the substrate 1 and the semiconductor chip 4. The XY table 11 is mounted on the supporting element 7, and the optical detection device 10 has an optical probe which will be described later. Images of the substrate 1 and semiconductor chip 4 obtained by the optical detection device 10 are synthesized by an image synthesizing circuit 12 and displayed on a TV monitor 13.

As shown in FIG. 5, the optical detection device 10 comprises an optical probe 20 which is moved between the substrate 1 and the semiconductor chip 4, first and second optical means 25A and 25B and first and second illumination means 30A and 30B which are associated with the optical probe 20, and first and second image pickup means 35A and 35B for picking up the images which are of the substrate 1 and semiconductor 4 and focused by the first and second optical means 25A and 25B.

As seen from FIGS. 4 and 5, the optical probe 20 includes a first image acquisition prism 21A and a second image acquisition prism 21B. The first image acquisition prism 21A causes a 90-degree rotation of a first image of the surface of the semiconductor chip 4, e.g., an alignment mark applied to the semiconductor chip 4, a bump on the semiconductor chip 4 or the like. The second image acquisition prism 21B causes a 90-degree rotation of a second image of the surface of the substrate 1, e.g., an alignment mark applied to the substrate 1 or a pad on the substrate 1 in a different direction from the first image or the like. The optical probe 20 further includes a first optical system introduction prism 22A and a second optical system introduction prism 22B which are respectively provided on both sides of the first and second image acquisition prism 21A and 21B. The first image obtained by the first image acquisition prism 21A is reflected by the first optical system introduction prism 22A which causes a 90-degree reflection of the first image and then enters into a first optical means 25A. Likewise, the second image obtained by the second image acquisition prism 21B is reflected 90 degrees by the second optical system introduction prism 22B and enters into a second optical means 25B.

The above-described first and second illumination means 30A and 30B are perpendicularly disposed in respective positions between the first and second optical means 25A and 25B and first and second image pickup means 35A and 35B. Illuminating light beams produced by the first and second illumination means 30A and 30B are respectively projected (as projected light beams 32A and 32B) in the directions of the first and second optical means 25A and 25B by first and second half-mirrors 31A and 31B. These projected light beams 32A and 32B are respectively projected on the semiconductor chip 4 and substrate 1 via the first and second optical means 25A and 25B, first and second optical system introduction prisms 22A and 22B and first and second image acquisition prisms 21A and 21B.

The projected light 32A strikes the semiconductor chip 4, and thus becomes reflected light 33A. A first image (of the semiconductor chip 4) based on this reflected light 33A passes through the first image acquisition prism 21A, first optical system introduction prism 22A, first optical means 25A and first half-mirror 31A and is picked up by the first image pickup means 35A. The projected light 32B strikes the substrate 1, and thus becomes reflected light 33B. A second image (of the substrate 1) based on this reflected light 33B passes through the second image acquisition prism 21B, second optical system introduction prism 22B, second optical means 25B and second half-mirror 31B and is picked up by the second image pickup means 35B.

The first image of the downward-facing surface of the semiconductor chip 4 is caused to be incident on the first image acquisition prism 21A, and the second image of the upward-facing surface of the substrate 1 is caused to be incident on the second image acquisition prism 21B. Consequently, if the first and second images produced by the first and second image acquisition prisms 21A and 21B were merely reflected by the first and second optical system introduction prisms 22A and 22B, the images picked up by the first and second image pickup means 35A and 35B would not be in a relationship suitable for superimposition with the surface positions arranged in the corresponding image positions. Accordingly, as shown in FIGS. 4 and 6, the first image which is picked up by the first image pickup means 35A is reflected by an inverting mirror 40 so that a mirror image is formed and then picked up by the perpendicularly installed first image pickup means 35A.

The first and second images picked up by the first and second image pickup means 35A and 35B are synthesized by the image synthesizing circuit 12 shown in FIG. 5, and the synthesized images are shown on a TV monitor 13. Then, the XY table 2 is driven so that any positional discrepancies between the two images are corrected, thus aligning the two images. Afterward, the XY table 11 is driven so that the optical probe 20 of the optical detection device is withdrawn from between the substrate 1 and the semiconductor chip 4. Then, the bonding head 5 is lowered so that the semiconductor chip 4 is bonded to the substrate 1.

In the prior art described above, in order to place the two images in a relationship which is suitable for superimposition with surface positions arranged in the corresponding image positions, the first image is converted into a mirror image by an inverting mirror 40. Since the first and second image acquisition prisms 21A and 21B and first and second optical system introduction prisms 22A and 22B are provided in front of the first optical means 25A, there is no space to install an inverting prism 40 in this area. For this reason, the inverting mirror 40 is installed between the first optical means 25A and first image pickup means 35A as seen from FIG. 7.

As seen from the above, the prior art optical detection device 10 is designed so that the first image of the first optical means 25A is reflected by the inverting mirror 40, and this reflected first image is picked up by the first image pickup means 35A. Accordingly, the size of the of the optical detection device 10 needs to be large, and its structure is complicated. In addition, the optical detection device 10 repeatedly advances into and withdraws from the space between the substrate 1 held on the substrate chuck 3 and the semiconductor chip 4 held on the chip chuck 6 for every bonding operation; accordingly, if the optical detection device 10 is large, the XY table 11 must be also large so as to withstand a higher load. As a result, the size of the bonding apparatus increases, and the cost of the apparatus also increases. Furthermore, if the size of the XY table increases, the advancing and withdrawing stroke for each bonding are also increased, thus lowering the bonding speed; and in addition, the structure becomes further complicated, and deviations of the optical axis caused by heat, vibration and changes over time tend to occur, leading to a drop in the precision of detection.

SUMMARY OF THE INVENTION

Accordingly, the object of the present invention is to provide a bonding apparatus equipped with an optical detection device which is smaller than prior art optical detection devices.

The above object is accomplished by a unique structure of the present invention for a bonding apparatus which includes an optical detection device comprising: an optical probe which can be moved between first and second parts that are positioned to face each other so as to be bonded, first and second optical means which focus respective images of the first and second parts from the optical probe, and an image pickup means which pick up the images focused by the first and second optical means, so that bonding is performed after the first and second parts are aligned on the basis of the detection results obtained by the optical detection device, and in the present invention, the above-referred optical probe comprises: first and second image acquisition prisms which reflect first and second images of the first and second parts in different directions; a first optical system introduction prism or mirror which causes the first image of the first part that passes through the first image acquisition prism to be reflected an even number of times and then sends this first image to the first optical means; and a second optical system introduction prism or mirror which causes the second image of the second part that passes through the second image acquisition prism to be reflected an odd number of times and then sends this second image to the second optical means.

In the present invention, the above first optical system introduction prism is either a pentagonal prism, a roof prism, a 45-degree deflection prism which reflects twice, a 30-degree deflection prism which reflects twice, a Doubress's prism which reflects four times, or a Porro prism which reflects four times; and any combination of these elements can be also employed.

DETAILED DESCRIPTION OF THE PREFERRED EMBODIMENTS

One embodiment of the present invention will be described with reference to FIG. 1. Parts which are the same as parts in FIGS. 4 through 7 or which correspond to such parts are labeled with the same symbols, and a detailed description of such parts is omitted.

In this embodiment, a pentagonal prism (also called as "pentaprism") 45 is employed. This pentagonal prism 45 is a twice-reflecting prism and provided on one side of the first and second image acquisition prisms 21A and 21B so as to reflect the light of the first image (of the semiconductor chip 4) twice at 45a and 45b. In other words, the pentagonal prism 45 is installed as a first optical system introduction prism instead of the first optical system introduction prism 22A shown in FIG. 5. The other constituting elements are substantially the same as those in the prior art shown in FIG. 5, and the second optical system introduction prism 22B is provided on another side of the first and second image acquisition prisms 21A and 21B so as to reflect the light of the second image (of the substrate 1) once at 22Ba.

Figure 5:
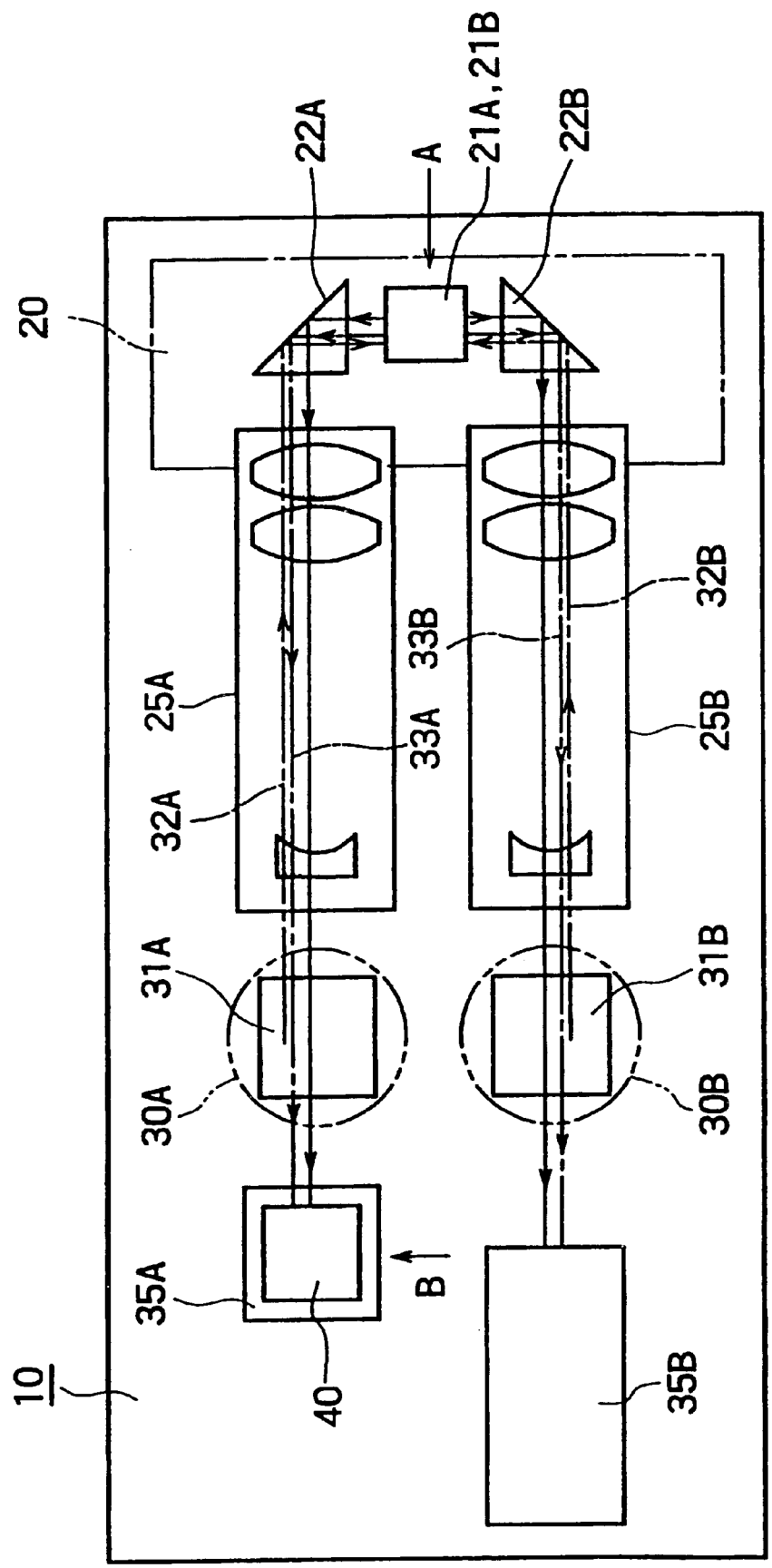
FIG. 5 is a top view of a conventional optical detection device.
Figure 6:
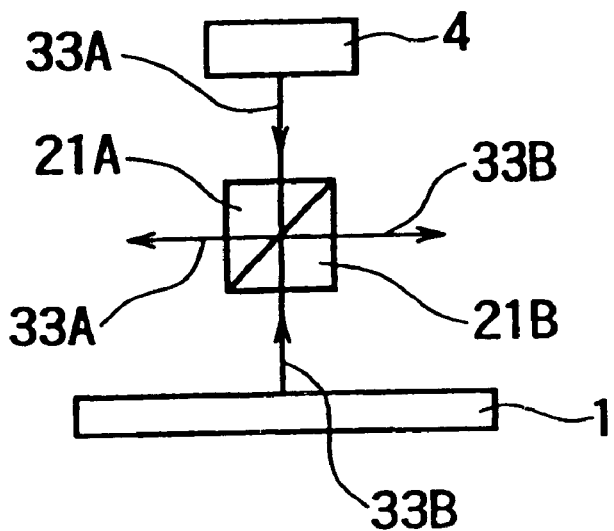
FIG. 6 is an explanatory diagram which shows the image acquisition prism parts as viewed from the direction indicated by arrow A in FIG. 5.
Figure 7:
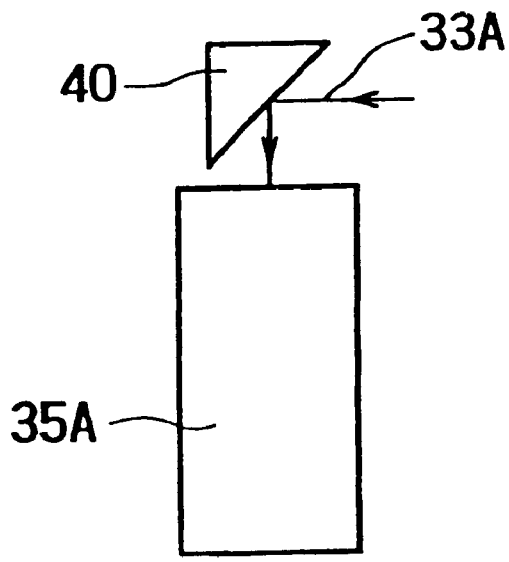
FIG. 7 is an explanatory diagram which shows the first image pickup means as viewed from the direction indicated by arrow B in FIG. 5.

In this embodiment, a mirror image of the semiconductor chip 4 is produced by this twice-reflecting prism 45; accordingly, the inverting prism 40 shown in FIGS. 5 and 7 is unnecessary. As a result, the structure between the first optical means 25A and the first image pickup means 35A can be simplified, and the size of the optical detection device 10 is reduced. Accordingly, the size of the XY table 11 shown in FIG. 4 can be reduced, the overall size of the bonding apparatus can be reduced, and also the cost of the apparatus can be reduced.

Furthermore, the stroke by which the optical detection device 10 is moved during bonding is shortened, so that the bonding speed can be increased. Moreover, since an optical element (the inverting prism 40) is unnecessary, the structure is simple, so that deviations in the optical axis caused by heat, vibration and changes over time can be reduced, thus improving the precision of detection.

In the above embodiment, the pentagonal prism (also called as "pentaprism") is used as the twice-reflecting prism. However, the present invention is not limited to a pentagonal prism; and it is also possible to use, for example, a Roof prism (also called a "roof prism"), a 45-degree deflection prism which reflects twice, and a 30-degree deflection prism which reflects twice. In addition, these elements can be used independently or by way of any combination thereof.

In addition, the present invention is not limited to the use of twice-reflecting prisms, and a Doubress's prism which reflects the lights four times, or a Porro prism which reflects four times can be employed. In other words, in the present invention, it is sufficient that one optical system introduction means (the pentagonal prism 45) reflects an even number of times (not limited to two times), and the other optical system introduction means (the prism 22B) reflects an odd number of times. It is also sufficient that one of the two optical system introduction prisms reflects an odd number of times, while the other reflects an even number of times.

Figure 1:
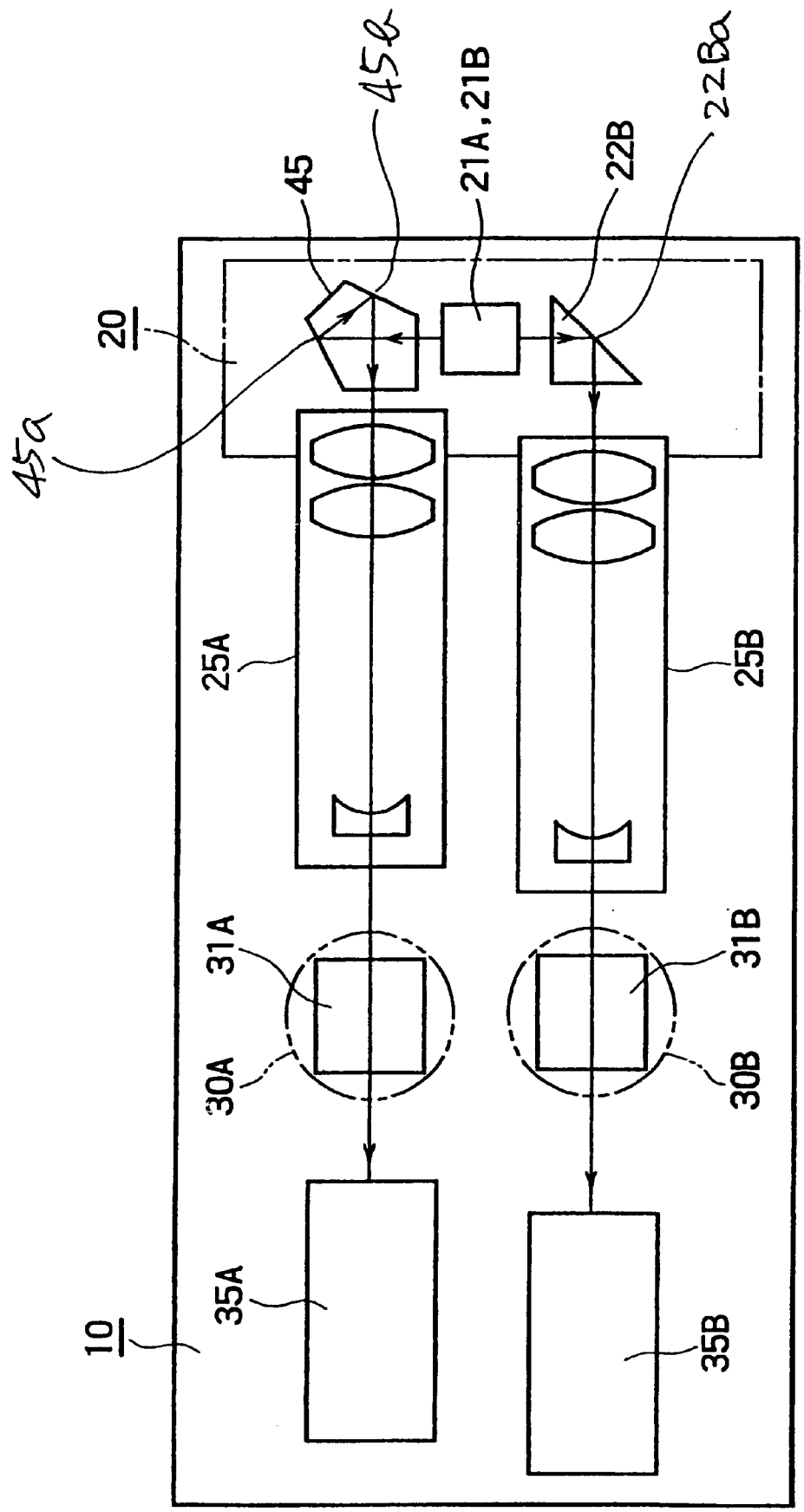
FIG. 1 is a top view of one embodiment of the optical detection device used in the bonding apparatus of the present invention.

Furthermore, with the use of the pentagonal prism 45 as shown in FIG. 1, the light is reflected twice by the twice-reflecting prism 45 before entering the first optical means 25A. Accordingly, the first optical means 25A can be installed in close proximity to the twice-reflecting prism or the pentagon prism 45; and therefore, the size of the optical detection device 10 can be reduced in this respect as well.

Figure 2:
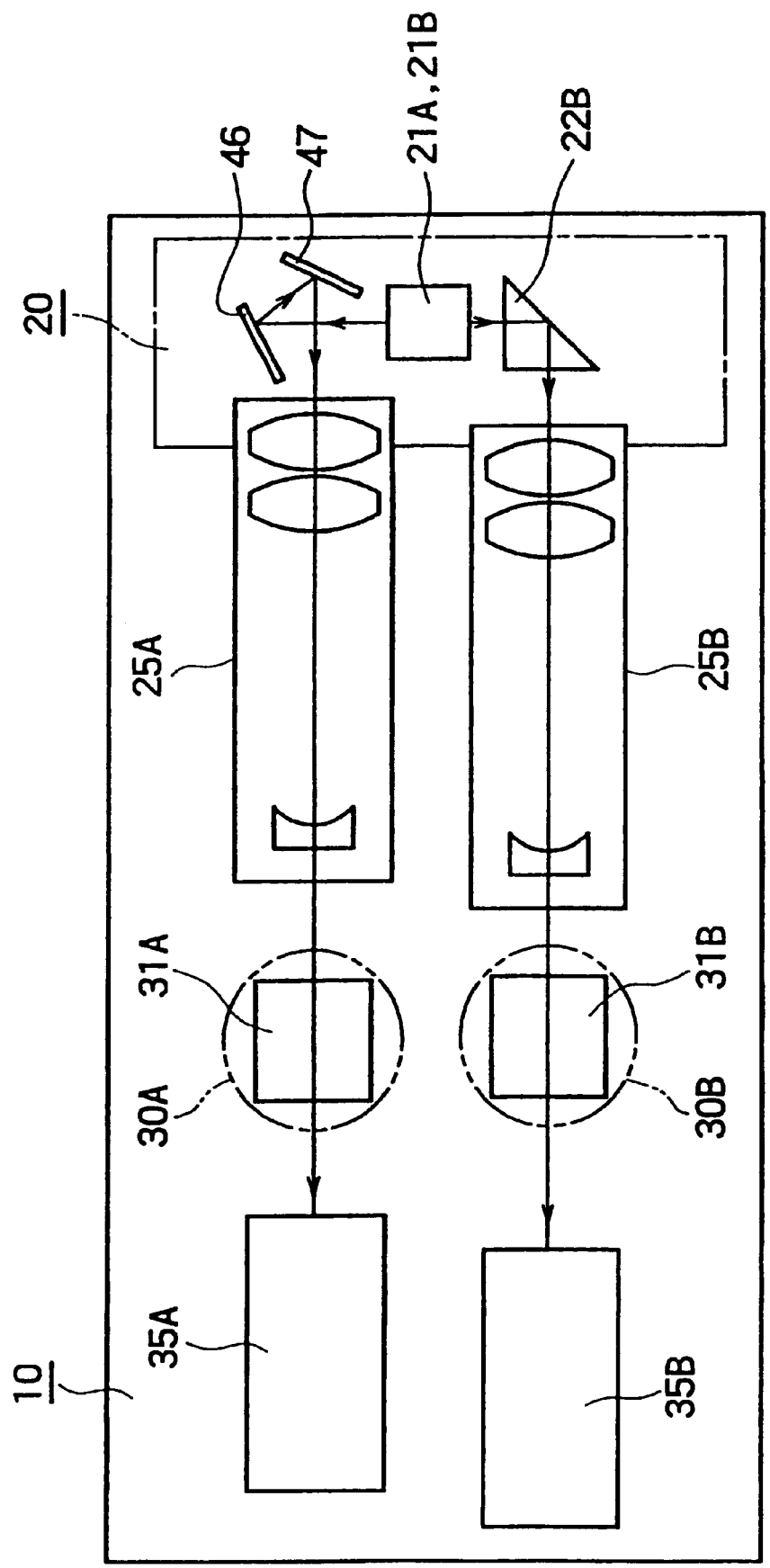
FIG. 2 is a top view of another embodiment of the optical detection device used in the bonding apparatus of the present invention.

FIG. 2 shows another embodiment of the present invention.

In this embodiment, two mirrors 46 and 47 are used instead of the twice-reflecting prism 45. The other constituting elements are substantially the same as those shown in FIG. 1. The same effect as that obtained in the above-described embodiment of FIG. 1 is obtained by this configuration which uses two mirrors 46 and 47 as well which are arranged so as to be about 45 degrees apart. When the mirrors 46 and 47 are used, various types of aberration such as color aberration, etc. that are generated in the use of a prism (45) can be suppressed. As in the embodiment in FIG. 1, the number of mirrors used is not limited to two; and it is sufficient if an even number of mirrors are used for an even number of reflections.

Figure 3:
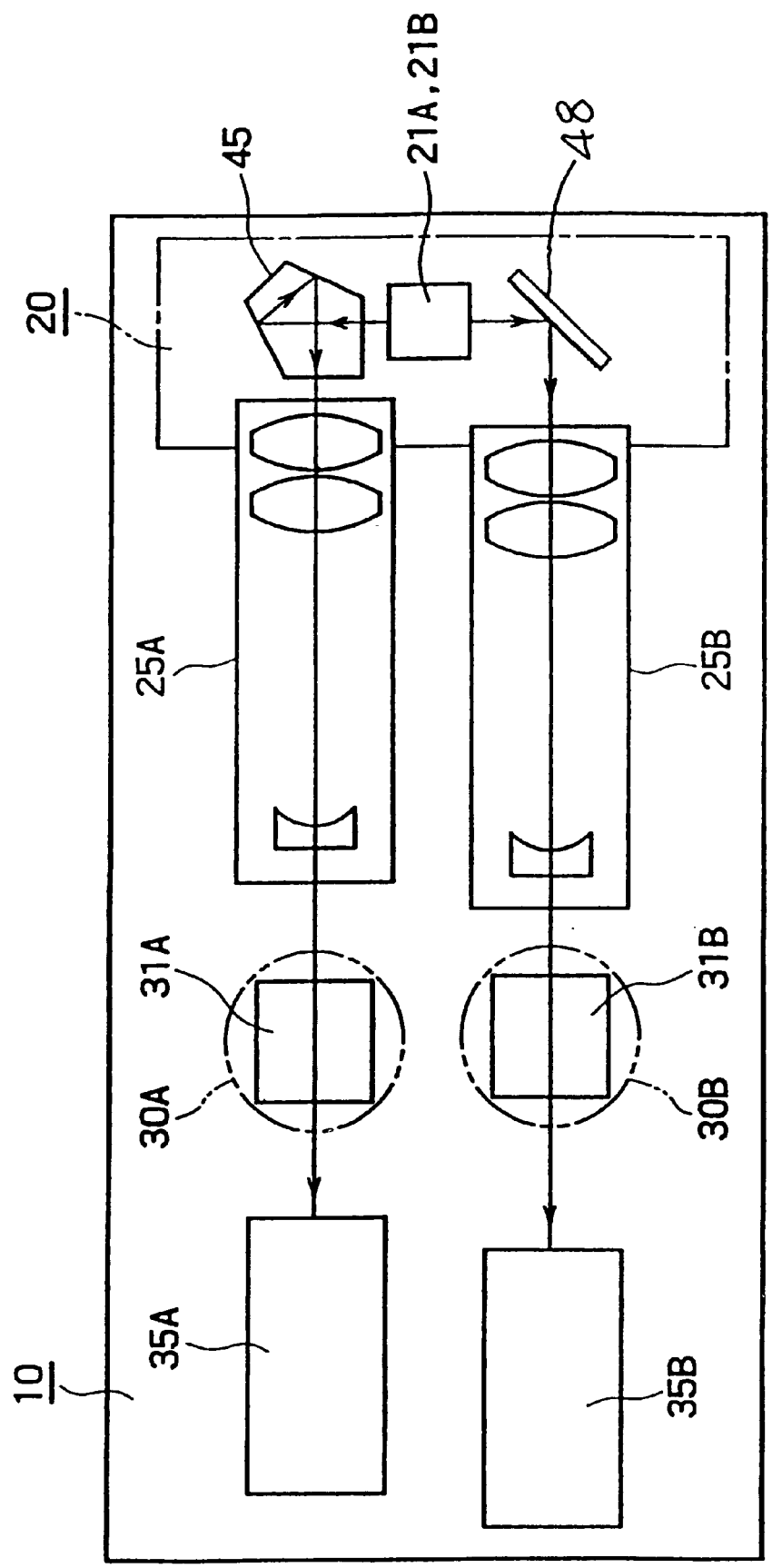
FIG. 3 is a top view of still another embodiment of the optical detection device used in the bonding apparatus of the present invention.
Figure 4:
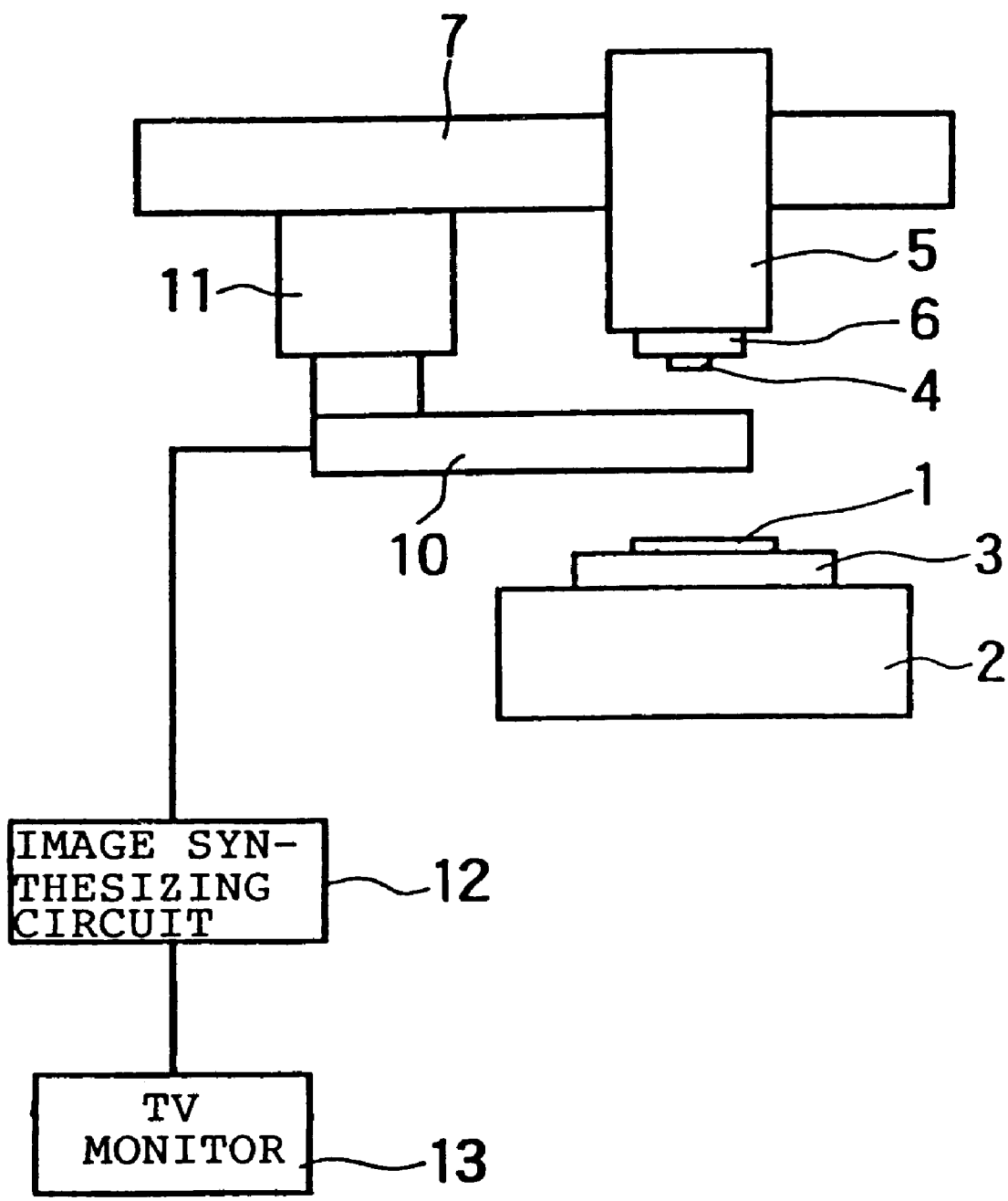
FIG. 4 is an explanatory diagram which illustrates the schematic construction of a bonding apparatus.

FIG. 3 shows still another embodiment of the present invention.

In this embodiment, instead of the prism 22B used in FIG. 1, a mirror 48 is used so that the image of the substrate 1 is reflected 45 degrees once (or odd number of times) by the mirror 48. With this structure, in which the other constituting elements are substantially the same as those in FIG. 1, the same effect as that obtained in the embodiment of FIG. 1 is obtained. Obviously, in this structure of FIG. 3, a pair of mirrors 46 and 47 as shown in FIG. 2 can be employed instead of the prism 45.

As to the first and second illumination means 30A and 30B, these illumination means 30A and 30B and the first and second half-mirrors 31A and 31B may be installed anywhere as long as these parts are installed so that the first and second illumination means 30A and 30B do not interfere with the semiconductor chip 4, bonding head 5, chip chuck 6, etc. of the bonding apparatus as a result of the movement of the optical probe 20.

As described above in detail, according to the present invention, an optical probe comprises: first and second image acquisition prisms which reflect first and second images of first and second parts in different directions, a first optical system introduction prism or mirror which causes a first image of the first part that passes through the first image acquisition prism to be reflected an even number of times and then sends this first image to a first optical focusing means, and a second optical system introduction prism or mirror which causes a second image of the second part that passes through the second image acquisition prism to be reflected an odd number of times and then sends this second image to a second optical focusing means. Accordingly, the size of the optical detection device can be reduced.

What is claimed is:

1. A bonding apparatus equipped with an optical detection device comprising: an optical prose which is movable between first and second parts that are positioned to face each other so as to be bonded, first and second optical means which focus respective images of said first and second parts from said optical probe, and image pickup means which pick up the images focused by said first and second optical means, so that bonding is performed after said first and second parts are aligned based upon detection results obtained by said optical detection device, wherein said optical probe comprises:

first and second image acquisition prisms which respectively reflect first and second images of said first and second parts in different directions;

a first optical system introduction means which is provided on one side of said first and second image acquisition prisms and causes said first image of said first part that passes through said first image acquisition prism to be reflected an even number of times and sends said first image to said first optical means, and a second optical system introduction means which is provided on another side of said first and second image acquisition prisms and causes said second image of said second part that passes through said second image acquisition prism to be reflected an odd number of times and sends said second image to said second optical means.

2. A bonding apparatus according to claim 1, wherein said first optical system introduction means is one selected from the group consisting of a pentagonal prism, a Roof prism, a 45-degree deflection prism which reflects twice, a 30-degree deflection prism which reflects twice, a Doubress's prism which reflects four times, and a Porro prism which reflects four times or a combination thereof.

3. A bonding apparatus according to claim 1, wherein said first optical system introduction means is a plurality of mirrors provided so as to make an even number of reflections of said first image.

4. A bonding apparatus according to claim 1, wherein said second optical system introduction means is a prism for making an odd number of reflections of said second image.

5. A bonding apparatus according to claim 1, wherein said second optical system introduction means is a mirror for making an odd number of reflections of said second image.

* * * * *